US010599738B1

(12) United States Patent
Bayliss-McCulloch et al.

(10) Patent No.: US 10,599,738 B1
(45) Date of Patent: Mar. 24, 2020

(54) REAL-TIME GENERATION OF AN IMPROVED GRAPHICAL USER INTERFACE FOR OVERLAPPING ELECTRONIC CONTENT

(71) Applicant: Google Inc., Mountain View, CA (US)

(72) Inventors: Jordan Bayliss-McCulloch, Mountain View, CA (US); Andrew Foster, Mountain View, CA (US)

(73) Assignee: Google LLC, Mountain View, CA (US)

( * ) Notice: Subject to any disclaimer, the term of this patent is extended or adjusted under 35 U.S.C. 154(b) by 337 days.

(21) Appl. No.: 15/195,384

(22) Filed: Jun. 28, 2016

Related U.S. Application Data

(63) Continuation of application No. 13/859,525, filed on Apr. 9, 2013, now abandoned.

(51) Int. Cl.
*G06F 17/30* (2006.01)
*G06F 7/00* (2006.01)
(Continued)

(52) U.S. Cl.
CPC ........ *G06F 16/9537* (2019.01); *G06F 3/0481* (2013.01); *G06F 3/0484* (2013.01);
(Continued)

(58) Field of Classification Search
CPC .. G06F 17/3087; G06F 3/0481; G06F 3/0484; G06F 17/30241; G06F 17/30601; G06F 17/30867
(Continued)

(56) References Cited

U.S. PATENT DOCUMENTS 7,131,060 B1 * 10/2006 Azuma .................. G06T 11/60
715/260
7,685,192 B1 * 3/2010 Scofield ................ G06F 16/954
707/709
(Continued)

FOREIGN PATENT DOCUMENTS

WO   WO-2009/052245    4/2009
WO   WO-2010/008464    1/2010
WO   WO-2010/093618    8/2010

OTHER PUBLICATIONS

Office Action on U.S. Appl. No. 13/859,525 dated Nov. 18, 2015.
Office Action on U.S. Appl. No. 13/859,525 dated Mar. 31, 2016.

*Primary Examiner* — Pavan Mamillapalli
(74) *Attorney, Agent, or Firm* — Foley & Lardner LLP

(57) ABSTRACT

A system to improve real-time generation of a graphical user interface for overlapping electronic content is described. The system retrieves, responsive to a search request input into a computing device and received via a computer network, places of interest from a places of interest database, and content items from a content item database. The system selects, based on a heuristic technique, a content item as a match for a place of interest. The system combines the content item with the place of interest to prevent a first marker of the content item from obscuring a second marker of the place of interest. The system renders, for display on the graphical user interface via the computing device, a single marker for the content item and the place of interest combined to prevent the first marker of the content item from obscuring the second marker of the place of interest.

18 Claims, 5 Drawing Sheets

(51) Int. Cl.
 *G06F 16/9537* (2019.01)
 *G06F 3/0481* (2013.01)
 *G06F 3/0484* (2013.01)
 *G06F 16/29* (2019.01)
 *G06F 16/28* (2019.01)
 *G06F 16/9535* (2019.01)

(52) U.S. Cl.
 CPC ............ *G06F 16/287* (2019.01); *G06F 16/29* (2019.01); *G06F 16/9535* (2019.01)

(58) Field of Classification Search
 USPC .......................................................... 707/737
 See application file for complete search history.

(56) References Cited

U.S. PATENT DOCUMENTS

| | | | |
|---|---|---|---|
| 8,055,655 B1 | 11/2011 | He et al. | |
| 8,078,601 B1 | 12/2011 | Egnor et al. | |
| 9,082,077 B2* | 7/2015 | Petersen | G06Q 30/0282 |
| 9,464,908 B2* | 10/2016 | Oel | G01C 21/3476 |
| 10,162,838 B2* | 12/2018 | Rosenstock | G06F 16/29 |
| 2005/0065959 A1 | 3/2005 | Smith et al. | |
| 2008/0086356 A1 | 4/2008 | Glassman et al. | |
| 2008/0285886 A1* | 11/2008 | Allen | G06T 17/05 382/284 |
| 2009/0198767 A1* | 8/2009 | Jakobson | G01C 21/3679 709/203 |
| 2010/0004004 A1* | 1/2010 | Browne-Swinburne | H04W 4/029 455/457 |
| 2010/0023259 A1* | 1/2010 | Krumm | G01C 21/20 701/532 |
| 2010/0191797 A1 | 7/2010 | Seefeld et al. | |
| 2010/0257163 A1 | 10/2010 | Ohazama et al. | |
| 2011/0027659 A1 | 2/2011 | Kikuchi et al. | |
| 2011/0047509 A1 | 2/2011 | Arrasvuori | |
| 2011/0276591 A1 | 11/2011 | Bliss et al. | |
| 2012/0036140 A1* | 2/2012 | Nielsen | G06F 16/29 707/754 |
| 2012/0047175 A1 | 2/2012 | Qian et al. | |
| 2012/0158693 A1 | 6/2012 | Papadimitriou et al. | |
| 2012/0203457 A1* | 8/2012 | Casey | H04W 4/02 701/533 |
| 2012/0239509 A1 | 9/2012 | Badger et al. | |
| 2013/0007089 A1* | 1/2013 | O'Donnell | G09B 29/003 709/201 |
| 2013/0262479 A1* | 10/2013 | Liang | G06F 16/24578 707/748 |

* cited by examiner

REAL-TIME GENERATION OF AN IMPROVED GRAPHICAL USER INTERFACE FOR OVERLAPPING ELECTRONIC CONTENT

RELATED APPLICATIONS

The present application claims priority as a continuation application under 35 U.S.C. § 120 to U.S. patent application Ser. No. 13/859,525, titled "Performing Real-Time Clustering on a Map," filed Apr. 9, 2013, the entirety of which is hereby incorporated by reference.

BACKGROUND

A map web site displays a map, and stores data associated with the map. A portion of the map that the map web site displays may be selected via a user device. For example, a portion of the map to view may be highlighted by selecting a neighborhood or by setting the dimensions of the portion manually with a cursor. The map may be augmented with content items, such as addresses, phone numbers and descriptions provided by business establishments.

When the user device is used to search the map web site, the map web site delivers results that correspond to the search. The results may indicate places of interest, such as business establishments that correspond to the search. The map web site may indicate the results with the use of markers, such as graphical icons that pinpoint an address on the map corresponding to the searched for place of interest. The markers may include textual information, such as attributes associated with the searched for place of interest. Additionally, the map web site may deliver content items related to the results or the portion of the map being searched. The content items may also be indicated on the map via markers.

Sometimes the search on the map web site may cause the map web site to retrieve a content item and places of interest. For example, if the map web site delivers a marker for a content item, such as a local business establishment, and a search is performed on the user device that retrieves the business establishment (which had been registered independently as a place of interest), the map web site may render a map that indicates a marker for the business establishment as both a content item and a search result. When the map web site retrieves both markers for content items and search results, the markers may overlap and obscure one another. In this situation, the information associated with the content item and the search results may not be fully understood.

SUMMARY

A system and method for performing real-time clustering on a map sourced from a map web site, includes, a computer-readable storage medium storing a program of instructions for performing the real-time clustering on the map; a processor that executes the program of instructions; an input unit to receive a search request from a user device; a content item database to store a plurality of content items; a places of interest database to store a plurality of places of interest; a retrieval unit to retrieve, based on the search request, a plurality of retrieved places of interest from the places of interest database, and a plurality of retrieved content items from the content item database; a clustering unit to cluster for each of the plurality of retrieved content items if matched with at least one of the plurality of retrieved places of interest; and an output unit.

DESCRIPTION OF THE DRAWINGS

The detailed description refers to the following drawings, in which like numerals refer to like items, and in which.

DETAILED DESCRIPTION

Figure 1:
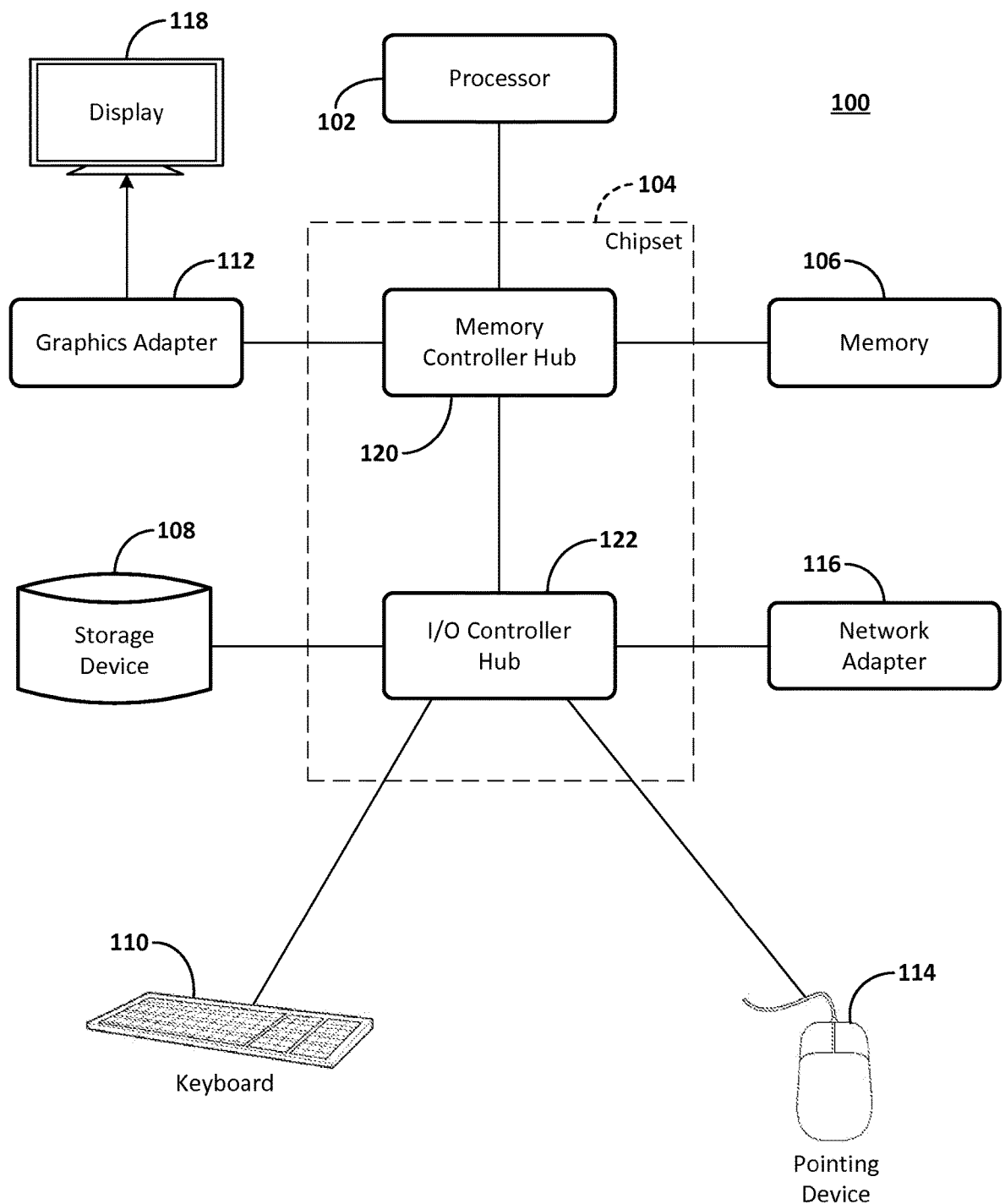
FIG. 1 is a block diagram illustrating an example computer.

Disclosed herein are methods and systems to determine whether a content item and a search result match, and after determining a match, displaying a single marker (i.e., a clustered marker) indicating a match between the content item and the search results has occurred. Because a single marker is used for both the content item and the search results, the displaying of a marker associated with a content item does not obscure a marker associated with a search result.

Several factors may be considered when determining if the content item and the search result match. In one example, relevant data associated with the content item and a searched for result, such as an address or telephone number may be cross referenced. In other examples, general descriptive attributes, such as whether the searched for result is a 'pizza place' may be used to determine whether a single marker may be employed for a content item and a search result.

The process of matching a content item with a search result may be performed offline. A map web site, after a search is performed on a user device, may display a predetermined number of results, such as the top ten most relevant results, while not displaying other results. The map web site may determine the top ten results using various heuristics, such as proximity to the area of the map being searched, and closeness to the terms used for the search, for example. If the top ten results are shown, the systems described herein may perform the above-described determination and clustering for the results offline. If a request is made on a user device to show the next ten most relevant results, or uses a scrolling function to display another portion of the map, the map web site may update the results based on either action. Due to the clustering being performed offline, the system performs the determination and clustering prior to the request to display more results or a scrolling operation to display another portion of the map.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

FIG. 1 is a diagram illustrating an example computer 100 for executing the methods and systems disclosed herein. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer system 100. The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the system and methods disclosed herein can vary depending upon the embodiment and the processing power required by the entity. The computer 100 may be a mobile device, tablet, smartphone or any sort of computing element with the above-listed elements. For example, a video corpus, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

Figure 2:
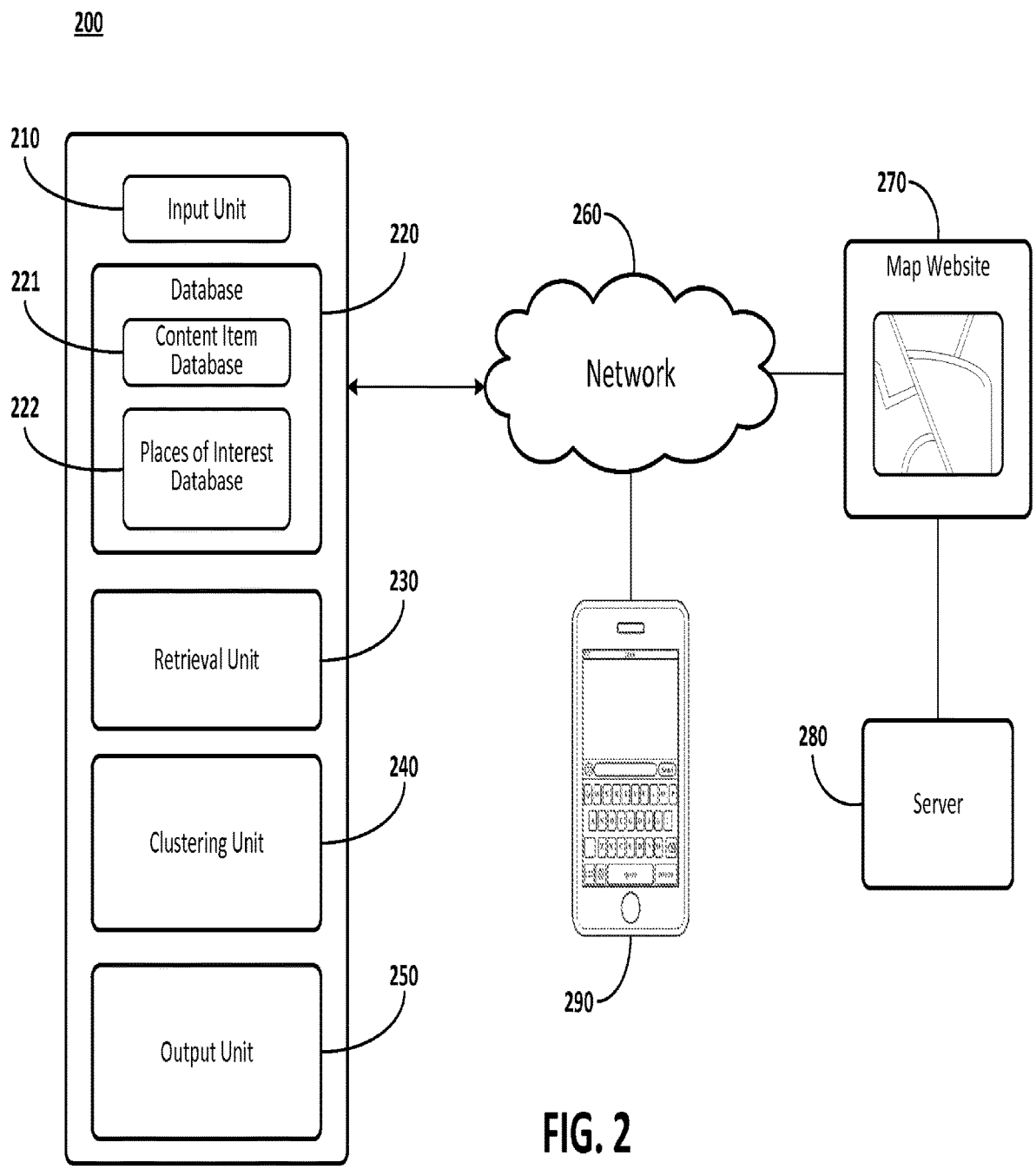
FIG. 2 illustrates an example of a system for performing real-time clustering on a map.

FIG. 2 illustrates an example of a system for performing real-time clustering on a map. The system 200 includes an input unit 210, a database 220, a retrieval unit 230, a clustering unit 240, and an output unit 250. As illustrated in FIG. 2, the system 200 communicates via network 260 to map web site 270 and user device 290.

The map web site 270 may be stored on a server 280. The map web site 270 may store data associated with a searchable map. Alternatively, the system 200 also may be implemented on the server 280. The server 280 and the user device 290 may be implemented as a device similar to computer 100. The map web site 270 is described as a web site, however, the systems and methods described herein may be implemented with a mobile application.

The input unit 210 receives a search request from the user device 290. The request may be in the form of a text, voice or an asserting of an icon on a graphical user interface. The search request may be accompanied with an indication of a search area. For example, the user device 290 may augment the search request with a zip code, address, neighborhood, or city, for example. Alternatively, the search request may be automatically generated by a user device 290. For example, if the user device 290 accesses map web site 270 or if the user device 290 scrolls to a different location on map web site 270, the search result may be automatically generated.

The database 220 includes a content item database 221 and a place of interest database 222. The database 220, and its various parts, may be implemented as a device similar to the storage device 108. Alternatively, system 200 may access via network 260 an external source, such as a remote server, for the information contained in database 220.

The content item database 221 stores additional items associated with points on the map associated with map web site 270. The elements contained in the content item database 221 may be externally added by third parties to include additional information about the point of the map. A description associated with the content item may include a phone number, additional information, a coupon code, for example. The map web site 270 may be configured to allow third parties to dynamically insert content items.

The place of interest database 222 stores various places of interest associated with a map of the map web site 270. The places of interest may be populated initially through a map creation process, and updated periodically by an operation of the map web site 270. The places of interest may be cross-referenced with the map through the use of geographical indicators, like address information and positional indicators.

A positional indicator may be generated by a user device 290 indicating that the user device 290 is at a specific place of interest. A global positioning satellite (GPS) associated with the user device 290 then may indicate to the map of the map web site 270 that the specific place of interest corresponds to the position indicated by the GPS. Alternatively, the positional indicator may also be generated by a server (based on data sent from the user device 290), with the corresponding positional indication being transmitted to the user device 290.

Additionally, the places of interest may appear on the map organically. An organic placement of a place of interest may be a place located on the map prior to any sort of registration. Thus, naturally occurring places, for example places initially labeled by a map creator (such as a park or statue), also may be considered a place of interest.

The retrieval unit 230 retrieves from the database 220, search results associated with the search request from the input unit 210. The retrieval unit 230 analyzes the search request and retrieves the various places of interest sourced from the places of interest database 222. The retrieval unit 230 may limit the search results by various heuristics, including relevance to the search request, proximity to a currently viewed portion of the map, or a user device defined position. Further, the retrieval unit 230 may limit the search results based on a predefined constraint by either the operator map web site 270 or a user defined value. The relevance to the search results may be determined by matching various parameters associated with the places of interests, such as addresses, phone numbers, and other identifying attributes. For example, if the user device generates a search request for 'pizza place' in 'neighborhood a', the retrieval unit 230 may retrieve from the places of interest database 222 all pizza places in neighborhood a.

Based on the portion of the map being displayed, which may be automatically determined by the map web site 270 or set based on the area being searched, the retrieval unit 230 may also retrieve content items from the content item database 222. The retrieval unit 230 may retrieve content items that are relevant to the search result, or may retrieve all the content items associated with the portion of the map being displayed.

The clustering unit 240 clusters the various retrieved content items and the various retrieved places of interest from the retrieval unit 230 based on a specific content item corresponding with a specific place of interest. The clustering unit 240 makes this determination by using various techniques discussed below. A map web site 270 operator may configure the system 200 to utilize all, some or none of the following techniques based on a desired granularity and accuracy desired with the clustering process.

If the content item and the place of interest are within a predefined distance of each other, the clustering unit 240 may cluster the content item and the place of interest to produce a clustered item. For example, if the predetermined distance is 250 meters, and the retrieval unit 230 retrieves a content item associated with a 'pizza place', and the corresponding place of interest within 250 meters, the clustering unit 240 may cluster.

The predetermined threshold may be set differently for various areas. For example, in a rural setting, the predetermined threshold may be set to a large distance due to the likelihood of a content item and a corresponding place of interest being spaced far apart from each other. However, in an urban setting, the predetermined threshold may be set to a small distance due to the likelihood there may be many content items and places of interest densely located together.

The content item and the place of interest may be encoded with various identifiers, such as an address, phone number, description, for example. The clustering unit 240 may determine that a specific content item and a specific place of interest may be clustered based on some or all of the various identifiers matching each other.

The content item and the place of interest may be clustered based on a similarity associated with domain names, or an aspect of a link to an associated web site. For example, if the content item and a place of interest share a domain name, a determination may be made to cluster these elements. An exact match between the domain names may not be necessary. Elements of each respective domain name or link may match, thus satisfying the determination to cluster. For example, if the content item has a domain name 'www-.nameA.com' and the place of interest has a domain name 'www.service.com/nameA', a determination to cluster may be made.

The output unit 250 renders markers on the portion of the map being displayed. Thus, when the user device 290 accesses the map web site 270 and views the portion of the map requested, the map web site 270 displays markers corresponding to the search results.

The output unit 250 renders an individual marker for each retrieved content item and each retrieved place of interest. If the clustering unit 240 determines that a specific content item and retrieved place of interest may be clustered, a single marker is used for both items to produce the clustered item. The marker used for each content item, place of interest and clustered item may be distinct. Further, if a specific content item and a specific place of interest are clustered, the marker may combine information associated and stored with the specific content item as well as the specific place of interest. Further, the marker used for the clustered item may be expandable by an operation to show both the content item and place of interest as individual markers.

The output unit 250 also may toggle between a mode where the markers are shown clustered, and a mode absent any sort of clustering. The selection of this mode may be determined by the operator of the map web site 270, an adjustable setting on the user device 290, or if requested by the generator of the specific content item. Further, the map web site 270 operator may determine that certain portions or search requests be displayed with clustering while other portion are displayed without clustering.

Figure 3:
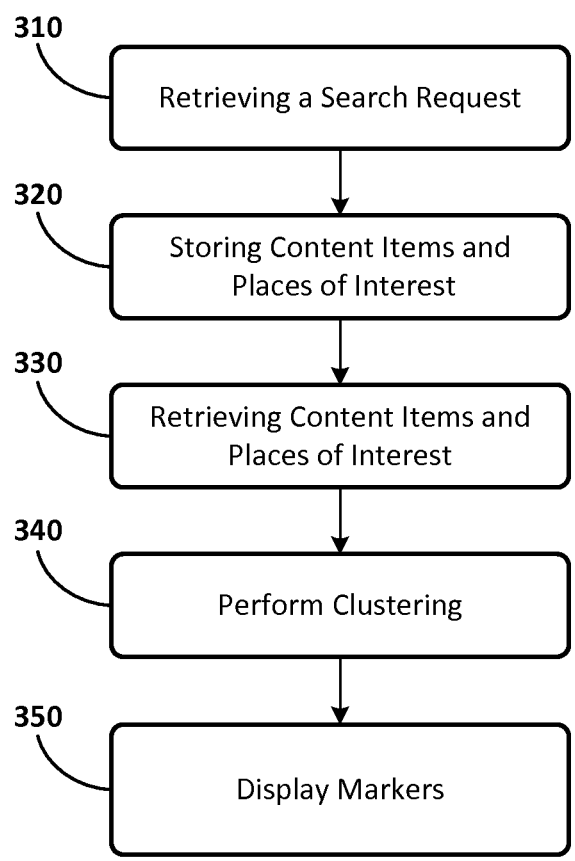
FIG. 3 illustrates an example of a method for performing real-time clustering on a map.

FIG. 3 illustrates an example of a method 300 for performing real-time clustering on a map. The method 300 may be implemented on the system 200 depicted in FIG. 2.

In operation 310, a search request is retrieved. The search request may be sourced from a user device 290. The request may be in the form of a text, voice or an assertion of an icon on a graphical user interface. The search request may be accompanied with an indication of a search area, such as a zip code, address, neighborhood, or city. Alternatively, the search request may be automatically generated by the user device 290. For example, if the user of user device 290 accesses map web site 270 or if a scrolling is performed on the map web site 270, the search result (or results) may be automatically generated.

In operation 320, content items and places of interest are stored. The content items may be externally added by third parties to include additional information about a point on the map. A description associated with the content item may include a phone number, additional information, a coupon code, for example. The map web site 270 may be configured to allow third parties to dynamically insert content items.

The places of interest may be populated initially through a map creation process, and updated periodically by an operation of the map web site 270. The places of interest may be cross-referenced with the map through the use of geographical indicators, like address information and positional indicators.

In operation 330, the various content items and places of interest (i.e. search results) stored in operation 320 are retrieved based on the search request in operation 310.

The search request is analyzed and cross referenced with the various stored places of interest. The retrieval may be limited by various heuristics, including relevance to the search request, proximity to a currently viewed portion of the map, or a user device 290 defined position. Further, the retrieval may be limited based on a predefined constraint by either the map web site 270 operator or a user defined value. The relevance to the search results may be determined by matching the search request with various parameters associated with the places of interests, such as addresses, phone numbers, and other identifying attributes. For example, if the user device 290 generates a search request for 'pizza place' in 'neighborhood a', places of interest that correspond to pizza places in neighborhood a may be retrieved.

Based on the portion of the map being displayed, which may be automatically determined by the map web site 270 or set based on the area being search, content items also may be retrieved. The retrieved content items may correspond to those that are relevant to the search result, or may correspond to all the content items associated with the portion of the map being displayed based on the search result.

In operation 340, a clustering is performed based on a specific content item corresponding with a specific place of interest. The determination to cluster is made by using various techniques discussed below. All, some or none of the following techniques may be implemented to perform the clustering based on a desired granularity and accuracy for the clustering.

If the content item and the place of interest are within a predefined distance of each other, a determination may be made that the content item and the place of interest may be clustered. For example, if the predetermined distance is 250 meter, and a content item associated with a 'pizza place' is retrieved, and the corresponding place of interest is within 250 meter, a determination is made to cluster.

The predetermined distance may be set differently for various areas. For example, in a rural setting, the predetermined distance may be set to a large distance due to the likelihood of a content item and a corresponding place of interest being spaced far apart from each other. However, in an urban setting, the predetermined threshold may be set to a small distance due to the likelihood there will be many content items and places of interest densely located together.

The content item and the place of interest may be encoded with various identifiers, such as an address, phone numbers, or descriptions. A determination may be made that a specific content item and a specific place of interest may be clustered based on some or all of the various identifiers matching each other.

The content item and the place of interest may be clustered based on a similarity associated with domain names, or an aspect of a link to an associated web site. For example, if the content item and a place of interest share a domain name, a determination may be made to cluster these elements. An exact match between the domain name is not necessary, and thus, elements of each respective domain name or link may match, thus satisfying the determination to cluster. For example, if the content item has a domain name 'www.nameA.com' and the place of interest has a domain name 'www.service.com/nameA', a determination to cluster may be made.

In operation 350, markers on the portion of the map being displayed are rendered. Thus, when the user device 290 accesses the map web site 270 and views a portion of the map requested, the map web site 270 displays markers corresponding to the search results.

An individual marker for each retrieved content item and each retrieved place of interest may be rendered. If, based on the determination made in operation 340, a specific content item and retrieved place of interest may be clustered, a single marker is used for both items. The marker used for each content item, place of interest and clustered item may be distinct from one another. Further, if a specific content item and a specific place of interest are clustered, the marker may combine information associated and stored with the specific content item as well as the specific place of interest.

Optionally, a mode where the markers are shown clustered, and a mode absent any sort of clustering may be toggled between each other. The selection of the mode may be determined by the operator of map web site 270, an adjustable setting on the user device 290, or if requested, by the source of the specific content item. Further, the map web site 270 operator may determine that certain portions or search requests be displayed with clustering while others are not.

Figure 4:
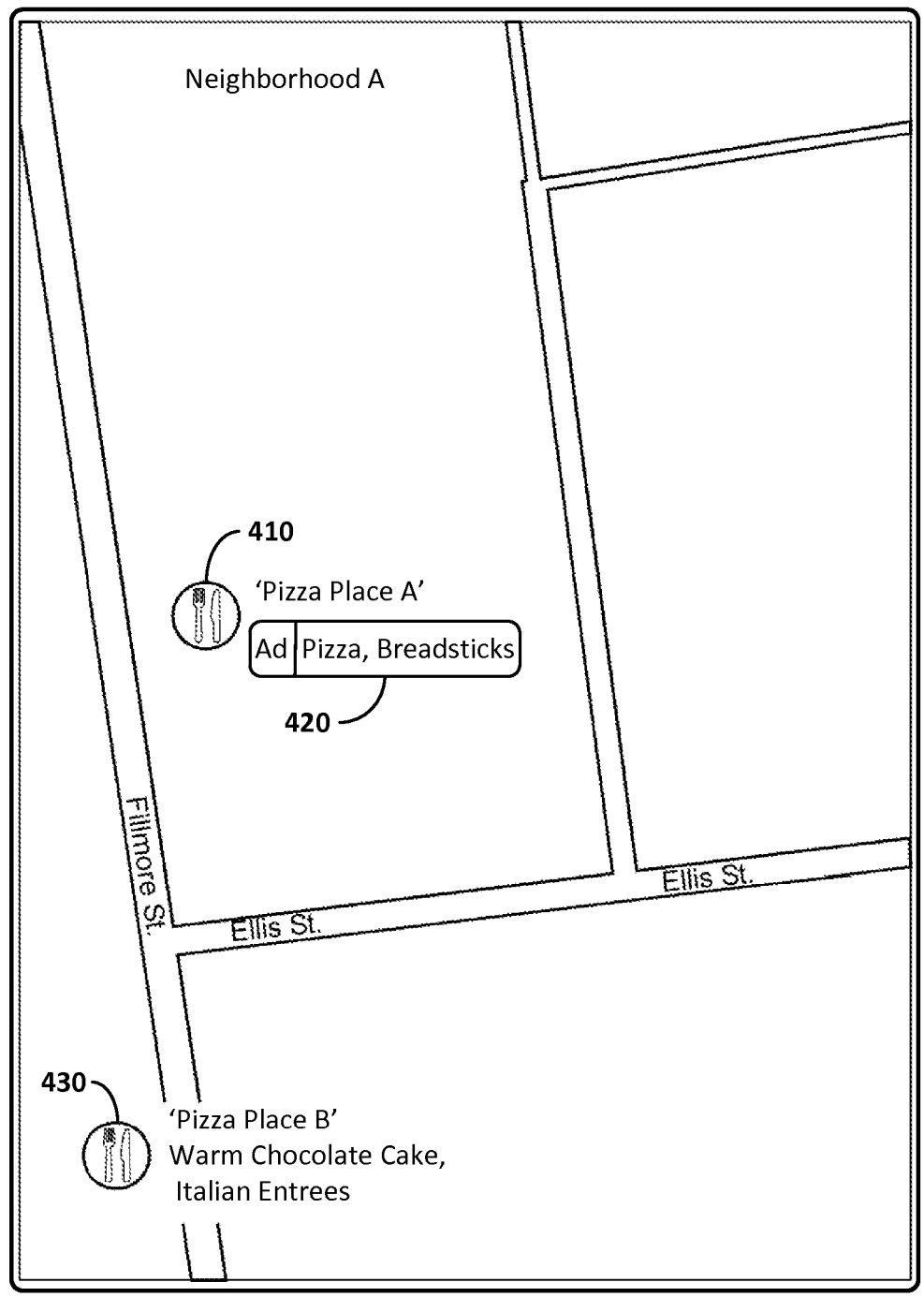
FIG. 4 illustrates an example of a display of the user device employing the aspects disclosed in regards to system disclosed in FIG. 2 and method illustrated in FIG. 3.

FIG. 4 illustrates an example of a display of the user device 290 employing the aspects disclosed in regards to system 200 and method 300.

Referring to FIG. 4, a map from a map web site 270 on a user device 290 is displayed after a search is requested for a 'pizza place' near 'neighborhood A'. The resultant screen displayed in FIG. 4 is the map undergoing a clustering performed by system 200.

Icon 410 is a clustered marker, and icon 430 is a marker absent any clustering. Thus, system 200 determines that icon 410 matches with content item 420 utilizing the aspects disclosed herein. Absent a clustering performed by system 200 (or if the user device 290 is set with clustering toggled 'off'), the map would have two different markers for 'pizza place A' obscuring each other, one for the place of interest and one for a content item.

Figure 5:
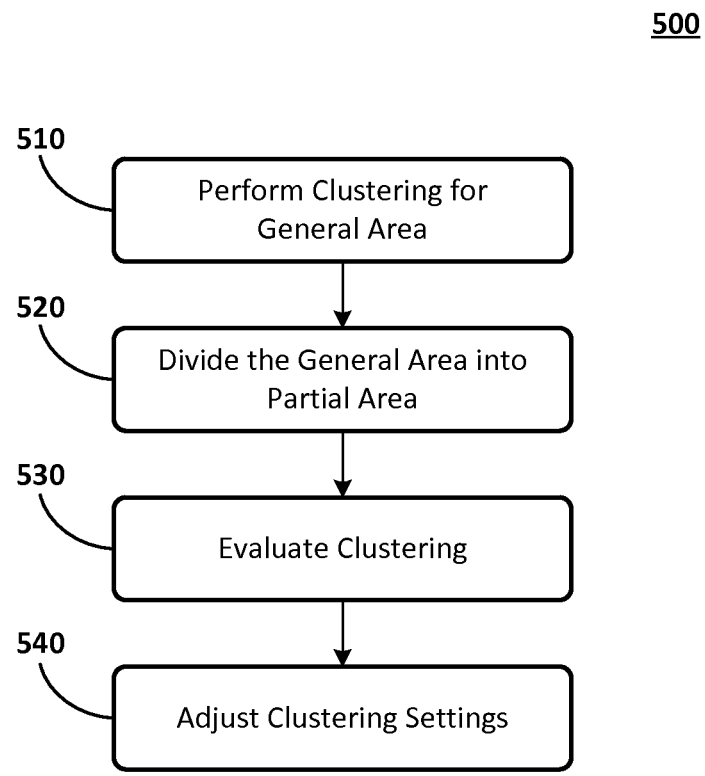
FIG. 5 illustrates an example of a method for optimizing a clustering for a general area.

FIG. 5 illustrates an example of a method 500 for optimizing a clustering for a general area.

In operation 510, the clustering operation of method 300 is performed for a general area on a map web site 270. The general area may be user defined, such as a state, region, country or the whole map. The operator may utilize a predefined threshold for the accuracy of the matching. As explained in operation 340, the accuracy of the clustering may be set by the use of various parameters and techniques.

In operation 520, the general area is divided into different partial areas. The partial areas may be predefined segments, neighborhoods, zip codes, for example.

In operation 530, an evaluation is performed on the accuracy of the clustering. For example, an operator may take samples from various regions and see if the clustered place of interest and content item truly match. Thus, an accuracy or percentage of true matches for every partial area may be obtained.

In operation 540, an adjustment of the predefined threshold is made for none, some or all of the partial areas. Thus, the amount of matching done may be set locally for different partial areas, thereby ensuring a desired accuracy level. In this way, if method 500 is employed, and an accuracy level of 90% is desired, operations 510 to 540 may be performed to ensure that a predetermined threshold set locally for each partial area achieves 90% accurate clustering.

Certain of the devices shown in FIG. 1 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIGS. 3 and 5. The disclosed devices, components, and systems contemplate using or implementing any suitable technique for performing the steps illustrated in these figures. Thus, FIGS. 3 and 5 are for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

What is claimed is:

1. A system to improve real-time generation of a graphical user interface for overlapping electronic content comprising:
    a retrieval unit executed by one or more processors of a server to retrieve, responsive to a single search request input into a computing device and received via a computer network, a plurality of places of interest from a places of interest database, and a plurality of content items from a content item database;
    a clustering unit executed by the one or more processors to:
        select a content item of the plurality of content items as a match for a place of interest of the plurality of places of interest using a heuristic technique;
        determine a probability that the content item and the place of interest refer to the same entity using the heuristic technique and in response to the place of interest being within a predefined distance from the content item;
        combine, responsive to determining the probability is above a threshold, a first marker for the content item with a second marker for the place of interest to a single marker indicating the same entity to prevent the first marker for the content item from obscuring the second marker for the place of interest; and
    an output unit executed by the one or more processors to render, for display on the graphical user interface via the computing device, the single marker for the content item and the place of interest responsive to the combination of the first marker for the content item and the second marker for the place of interest.

2. The system of claim 1, wherein the output unit is further configured to override display of the single marker based on a predefined setting.

3. The system of claim 1, wherein the clustering unit is further configured to combine the content item with the place of interest based on a first technique for a first area of a map on the graphical user interface, and a second technique for a second area of the map.

4. The system of claim 1, wherein the clustering unit is further configured to combine with a combination of a first technique and a second technique.

5. The system of claim 1, wherein the clustering unit is further configured to optimize a clustering for a general area of a map sourced from a map web site, and combine the content item with the place of interest based on the clustering.

6. The system of claim 5, wherein the clustering unit is further configured to:
    optimize the clustering based on a predefined threshold;
    divide the general area into a plurality of partial areas;

evaluate an accuracy of the clustering for each of the plurality of partial areas; and adjust the predefined threshold for each of the plurality of partial areas for a subsequent clustering.

7. The system of claim 1, wherein the clustering unit is further configured to determine a probability the place of interest and the content item refer to the same entity in response to a similarity associated with a parameter.

8. The system of claim 1, wherein the clustering unit is further configured to determine a probability the place of interest and the content item refer to the same entity in response to a similarity associated with a phone number.

9. The system of claim 1, wherein the clustering unit is further configured to determine a probability the place of interest and the content item refer to the same entity in response to a similarity associated with a description stored in the places of interest database.

10. The system of claim 1, wherein the clustering unit is further configured to determine a probability the place of interest and the content item refer to the same entity in response to a similarity associated with a domain configured for access via a network protocol of the computer network.

11. The system of claim 1, wherein the clustering unit is further configured to determine to cluster based on one of the content item or the place of interest not displayed by the output unit.

12. The system of claim 1, further comprising:
an input unit executed by the one or more processors to receive, via the computer network, a search request from the computing device.

13. A method of improving real-time generation of a graphical user interface for overlapping electronic content comprising:
retrieving, by a retrieval unit executed by one or more processors of a server, responsive to a single search request input into a computing device and received via a computer network, a plurality of places of interest from a places of interest database, and a plurality of content items from a content item database;
selecting, by a clustering unit executed by the one or more processors, a content item of the plurality of content items as a match for a place of interest of the plurality of places of interest using a heuristic technique;
determining a probability that the content item and the place of interest refer to the same entity using the heuristic technique and in response to the place of interest being within a predefined distance from the content item;
combining, by the clustering unit, responsive to determining the probability is above a threshold, a first marker for the content item with a second marker for the place of interest to a single marker indicating the same entity to prevent the first marker for the content item from obscuring the second marker for the place of interest; and
rendering, by an output unit executed by the one or more processors, for display on the graphical user interface via the computing device, the single marker for the content item and the place of interest responsive to the combination of the first marker for the content item and the second marker for the place of interest.

14. The method of claim 13, comprising:
overriding, by the clustering unit, displaying the single marker based on a predefined setting.

15. The method of claim 13, comprising:
combining, by the clustering unit, the content item with the place of interest using a first technique for a first area of a map on the graphical user interface, and a second technique for a second area of the map.

16. The method of claim 13, comprising:
combining the content item with the place of interest using a combination of a first technique and a second technique.

17. The method of claim 13, comprising:
optimizing a clustering for a general area of a map sourced from a map web site, and combining the content item with the place of interest based on the clustering.

18. The method of claim 17, comprising:
optimizing the clustering based on a predefined threshold;
dividing the general area into a plurality of partial areas;
evaluating an accuracy of the clustering for each of the plurality of partial areas; and
adjusting the predefined threshold for each of the plurality of partial areas for a subsequent clustering.

* * * * *